United States Patent [19]

Shiels

[11] Patent Number: 4,673,328
[45] Date of Patent: Jun. 16, 1987

[54] LIFT/TILT-BED TRAILER

[76] Inventor: J. Michael Shiels, 132 W. Houghton, Santa Fe, N. Mex. 87501

[21] Appl. No.: 743,313

[22] Filed: Jun. 10, 1985

[51] Int. Cl.$^4$ .............................................. B60P 1/02
[52] U.S. Cl. .................................. 414/471; 254/2 R; 254/3 R; 254/9 R; 254/10 R; 298/14; 298/17.5; 187/9 R; 414/917; 414/549; 414/460; 414/477; 414/482; 414/495; 414/498; 414/728; 414/559
[58] Field of Search ............... 414/917, 471, 498, 469, 414/473, 460, 474, 476, 549, 477, 479, 482, 495, 921, 728, 742, 559, 548; 298/11, 12, 14, 17 R, 17.5; 187/9 R; 254/10 R, 10 B, 10 C, 9 R, 3 R, 2 R

[56] References Cited

U.S. PATENT DOCUMENTS

| 1,748,292 | 2/1930 | Hughes et al. ......................... 298/12 |
| 2,485,300 | 10/1949 | Lisota . |
| 2,905,481 | 9/1959 | Schramm . |
| 2,910,197 | 10/1959 | Becker . |
| 3,362,552 | 1/1968 | Thiele ................................. 414/469 |
| 3,494,630 | 2/1970 | Smith . |
| 3,988,035 | 10/1976 | Corompt ............................... 298/12 |
| 4,049,143 | 9/1977 | Hatakka . |
| 4,077,643 | 3/1978 | Bates ................................. 280/43.18 |
| 4,109,811 | 8/1978 | Stucky ........................ 280/43.11 X |
| 4,318,656 | 3/1982 | Ezell .................................... 414/471 |
| 4,348,054 | 9/1982 | Shonkwiler ..................... 414/471 X |
| 4,576,539 | 3/1986 | Williams .......................... 414/921 X |

FOREIGN PATENT DOCUMENTS

| 1081777 | 5/1960 | Fed. Rep. of Germany ...... 414/471 |
| 2754009 | 6/1978 | Fed. Rep. of Germany ...... 414/495 |
| 57879 | 7/1946 | Netherlands ........................ 414/549 |
| 42963 | 3/1908 | Switzerland .......................... 298/13 |
| 684497 | 12/1952 | United Kingdom .................. 298/12 |

OTHER PUBLICATIONS

"Welker Trailer", in Road Rider, p. 23, Sep. 1984.

Primary Examiner—Frank E. Werner
Attorney, Agent, or Firm—Samuel M. Freund

[57] ABSTRACT

A lift/tilt-bed trailer. Apparatus is described for either raising from or lowering to the ground a trailer bed in a single step while maintaining a substantially horizontal attitude relative thereto, or for tilting the trailer bed which is normally positioned parallel to the ground when the trailer is in its traveling mode for the purpose of loading or unloading the bed without substantial change in the orientation of the trailer "U"-frame in which the bed is located. Four pivotable tracks attached to the frame and corresponding roller wheels attached to the bed cooperate to achieve the desired motion. Since the trailer need not be detached from whatever device is used to move it about when it is to be loaded or unloaded, increased stability results with consequent reduction in risk to the operator.

10 Claims, 3 Drawing Figures

LIFT/TILT-BED TRAILER

BACKGROUND OF THE INVENTION

The present invention relates generally to trailer and front wheel drive self-propelled vehicle bed moving apparatus, and more particularly to trailer bed lifting and tilting apparatus for changing the bed position from its traveling position within a movable frame to a position where it can easily be loaded or unloaded without having to tilt the frame which carries the bed or detach the frame from means for providing motion thereto.

The loading and unloading of trailers with fixed beds often requires that the trailer be detached from its hauling vehicle in order that the trailer may be tilted until the rear of the bed reaches the ground. Alternatively, a ramp may be used to bridge the gap between the horizontal, off the ground trailer and bed, and the ground. More complicated trailer designs include beds which can be displaced relative to their supporting frames. A simple design might include a bed pivoted at the rear of the frame with the front of the bed reversibly attached near the front of the frame. The frame, with the bed attached would then be tilted rearward until the rear of the bed rests on the ground, the front of the bed then detached from the frame and lowered using a winch, for example, until it reaches the ground, whereby the entire bed is situated on the ground with the rear of the trailer frame touching the ground, from which position the trailer may be loaded. The reverse procedure would return the loaded trailer to its horizontal position. A variation on this latter design is disclosed in U.S. Pat. No. 4,077,643 for "Drop Frame Trailer," issued to Dean E. Bates on Mar. 7, 1978. By employing a U-shaped axle which attaches the frame to a wheel suspension system which can be raised or lowered by rotation of the wheel suspension about this axle, however, the Bates invention allows the rear of the trailer frame to be raised from, or lowered to the ground without requiring that the trailer frame be detached from its driving vehicle. The front of the trailer frame can also then be raised or lowered without detaching the frame from its pulling vehicle. It would be desirable, however, to be able to place the trailer bed in its horizontal position in contact with the ground in a single lowering step. Moreover, occasions can be envisioned where it would be advantageous to maintain the bed in a horizontal attitude during the entire loading and unloading preocess. Neither of these objectives could be attained utilizing the Bates design.

A more complicated design for a trailer with a lowerable bed is disclosed in U.S. Pat. No. 4,109,811, "Trailer With Lowerable Bed," issued to James L. Stucky on Aug. 29, 1978. Therein, the bed of the trailer is pulled forward to a position whereby it first tilts the guiding structure upon which it is slidably located about a previously locked, wheeled transverse axle structure, which supports the guiding members and the bed, until the guiding members touch the ground, and then it is pulled further forward until the rear of the bed is stopped by the guiding members in front of the axle structure, but with the rear of the bed still maintaining contact with the guiding structure so that the process can be reversed once the trailer bed is loaded. The front of the bed can now be lowered from the hauling vehicle to permit the bed to come to a substantially horizontal position as may be required for loading and unloading. A similar pivoting track sliding arrangement operating in essentially the same way as Stucky' trailer is described in U.S. Pat. No. 4,318,656, "Equipment Trailer With Shiftable Trailer Bed," issued to Charles R. Ezell on Mar. 9, 1982. The principal difference between the two trailers appears to lie in the manner in which the bed guiding members pivot about the trailer wheels. it is important to recognize that some form of external hauling vehicle or apparatus is required to displace the trailer bed from the transporting wheeled axle structure in both the Stucky and the Ezell trailer designs since there are no disclosed trailer frame members surrounding the trailer bed which may be used to assist in moving the bed relative to the axle structure without the assistance of a device external to the trailer for supplying the required force. Moreover, a significant forward motion of the bed is required to achieve its horizontal position on the ground, and the hauling vehicle may have to be detached from the front of the trailer bed in order to load cargo which cannot be loaded from the side.

Accordingly, it is an object of the present invention to provide an apparatus for substantially horizontally raising and lowering a trailer bed for loading and unloading the bed in a single step without having to detach the draft vehicle.

Another object of the present invention is to provide an apparatus having the capability of also tilting the trailer bed for ease of unloading in some instances in addition to the horizontal raising and lowering capability thereof.

Yet another object of the present invention is to permit the raising and lowering of the trailer bed without the necessity of a hauling apparatus external to the trailer.

Still another object of my invention is to permit the raising and lowering of the trailer bed and the tilting thereof in a small horizontal distance rearward relative to the initial location of the trailer bed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purpose of the present invention, as embodied and broadly described herein, the apparatus of this invention may include a three-sided, substantially rectangular "U"-shaped frame, opposing ground wheels attached to the outside of the two parallel frame members without using a connecting axle joining them, a planar, rectangular bed adapted to fit essentially within the frame, two opposing pairs of track members pivotably located on the inside of the two parallel frame members, one in the vicinity of the frame member defining the base of the "U" and the other toward the opening of the "U", four bed translating members attached to the outside of the bed facing the track members in the vicinity thereof each bed translating member being adapted to move within a track and be guided thereby, and means for imparting motion to the bed relative to the frame, whereby the bed is raised and lowered in a substantially horizontal manner as it is moved toward or away from the frame member defining the base of the "U". Preferably, the bed translating members include roller wheels adapted to roll inside of the track members. Preferably also, means are provided for preventing the opposing track member pair closest to the frame member defining the base of the "U" from pivoting about their attachment locations to the parallel frame members in order that the bed reversibly tilt in such a manner that the end thereof facing the opening of the "U" drops toward the ground as the bed is moved away from the frame member defining the base of the "U" while the end of the bed facing the frame member defining the base of the "U" remains substantially in the plane of the frame.

Benefits and advantages of the present invention include the ability to raise and lower a trailer bed in a substantially horizontal manner in a single step in a short rearward horizontal distance of trailer bed motion relative to the initial traveling position of the bed without having to detach the apparatus which provides motion to the entire trailer assembly. Moreoever, the bed may also be tilted relative to the frame of the trailer in the event that it is more convenient to unload the trailer by sliding the cargo to the ground.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION OF THE PREFERRED EMBODIMENT

The present invention is a lift/tilt-bed trailer, the bed of which is designed to be lowered from a raised, traveling position in its carrying frame to the ground on which the frame is resting either retaining its substantially parallel attitude relative to the ground which it had in its traveling position, whereby cargo can be loaded without significant change in elevation, or attaining a tilted attitude such that the rear end of the bed reaches the ground while the front end thereof remains at the level of the frame in which position the bed serves as a ramp onto which cargo can be loaded or unloaded by causing it to move up or down the incline, respectively. With the cargo loaded thereon or affixed thereto, in the two configurations, respectively, the bed can be drawn by means of a cable device to its raised position in the frame and locked therein, substantially parallel to the ground, and the combined unit can be moved around as would be a conventional trailer.

Figure 1:
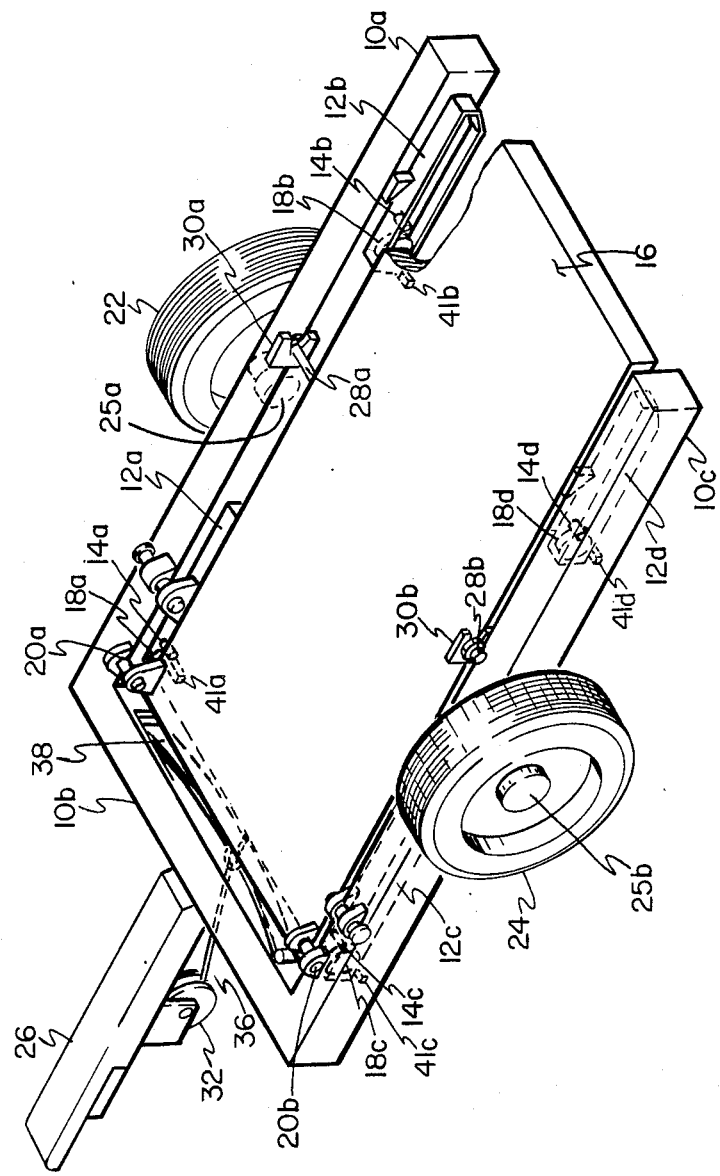
FIG. 1 represents an orthographic view of the preferred emodiment of the lift/tilt-bed trailer of the present invention showing the bed thereof in its traveling or bed up position.

Reference will now be made in detail to the present preferred embodiment of the invention, an example of which is illustrated in the accompanying drawings. Corresponding parts are referenced throughout by similar numbers therein. It should be mentioned at the outset that the tracks, which will be described in more detail hereinbelow, have been drawn in the Figures as having significantly greater obtuse angles with respect to the frame of the lift/tilt-bed trailer when the bed is located in its down or tilted positions than are practicable solely for the purpose of illustration. Actually, it has been experimentally determined that it is difficult to achieve the desired trailer bed motions when the tracks are permitted to attain such large angles by a choice of their length such that this would be possible. Turning now to the drawings, FIG. 1 represents an orthographic view of the preferred embodiment of the lift/tilt-bed trailer of the present invention with the bed thereof in its traveling or bed up position in the frame. A three-sided, rigid substantially rectanguler "U"-frame 10a–c has four tracks 12a–d pivotably mounted on pivots 14a–d in which the trailer bed 16 is slidably and pivotably located. In a preferred embodiment of my invention, roller wheels 18a–d are rotatably affixed to the bed 16 and enable the desired motion. Locking means 20a,b reversibly prevent the bed from moving once it is in its traveling position. Ground wheels 22, 24 rotatably mounted to the frame 10a–c by wheel mounting means 25a,b and a towing tongue 26 rigidly mounted thereto permit the lift/tilt-bed trailer to be conveniently towed as would be conventional trailers known in the art. Of course, it would be apparent to one of ordinary skill in the art practicing my invention to combine the "U"-frame, the lift/tilt-bed and the lift/tilt-bed positioning means thereof with an integral means of moving the entire assembly. That is, instead of towing my invention, it might be desirable to have the lift/tilt-bed incorporated into a self-propelled, front wheel drive vehicle having the same loading and unloading characteristics of the trailer embodiment described in detail herein.

Bed-positioning and capture means 28a,b,30a,b prevent the frame members 10a and 10c from significantly moving apart as the trailer is caused to execute turns. Shown in FIG. 1 are headed bars 28a,b rigidly affixed to the bed 16, which are automatically captured and substantially rigidly held in slotted members 30a,b, respectively, which are rigidly mounted on frame members 10a and 10c, respectively, when the bed is moved to its uppermost, traveling position relative to the frame 10a–c. A winch 32 acting through cable 36 attached to the front edge of the bed 16 enables an operator to move the bed 16 forward agasint the effects of gravity and ultimately, against a leaf-spring 38 when the bed is in its uppermost, traveling position, or to controllably release the bed 16 in a rearward direction under the action of these forces when the bed is loaded with cargo or empty. The leaf spring 38 is provided to push the bed rearward and away from the front frame member 10b to a position where the bed will move under the action of its own weight while its motion is controlled by the cable 36. It was found that the location of the winch 32 was determined to some extent by the requirement that the cable 36 have at all times an angle relative to the frame 10a–c such that the direction of the force exerted by the cable on the bed 16 does not tend to significantly rotate the bed.

Figure 2:
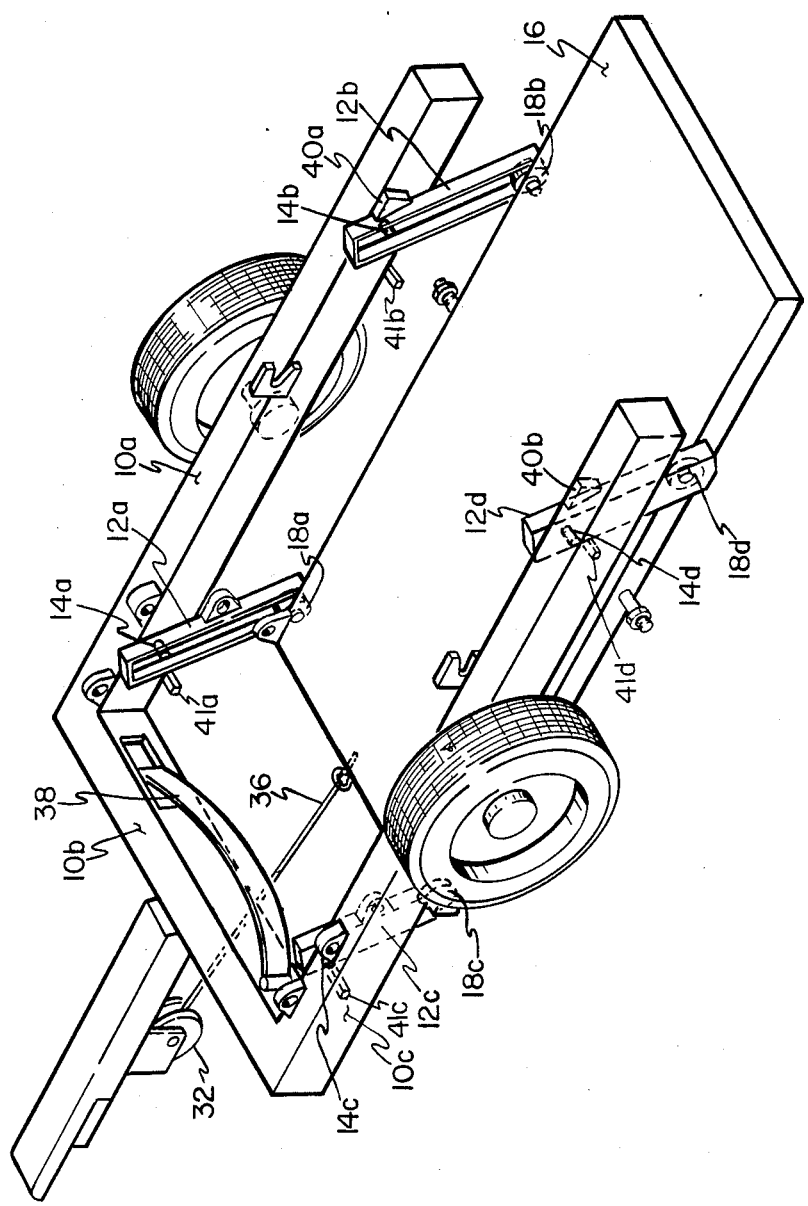
FIG. 2 shows an orthographic representation of the lift/tilt-bed trailer described in FIG. 1 hereof with the bed thereof in its lowered horizontal loading position relative to the frame.

FIG. 2 shows an orthographic representation of the lift/tilt-bed trailer of the present invention with the bed 16 in its lowered, substantially parallel to the ground loading position relative to frame the 10a–c. Roller wheels 18a–d have been permitted to pass the pivot location 14a–d in each of the tracks 12a–d by controllably allowing the bed 16 to move rearward under the sequential influence of leaf spring 38 and gravity. That is, once leaf spring 38 causes the bed 16 to slide back to the pivot points 14a–d, gravity will allow the downward force on the bed to cause the tracks 12a–d to pivot about the pivot points 14a–d in such a manner that the rearward facing end of each track touches the ground under the guidance of the winch 32 through cable 36. Blocks 40a,b prevent the rear tracks 12b,12d from pivoting past a chosen angle attained by the tracks at the position of rest of the bed 16 on the ground when the loaded bed is pulled forward by the winch. If the angle of these tracks is permitted to exceed this angle, the bed 16 has a demonstrated tendency of lifting the drive wheels 22,24 off of the ground when an attempt is made to restore the bed to its lifted or travel position using cable 36 and winch 32. Similarly, tabs 41a–d are provided to prevent the tracks from pivoting upward under the influence of an unbalanced load on the bed 16 as the bed nears the front frame member 10b, but before it is locked to the frame 10a–c using locking means 20a,b. In its lowered, substantially parallel to the ground position shown in FIG. 2, the bed 16 can be loaded by placing cargo directly thereon and returning the loaded bed to its traveling position by the operation of the winch 32 and the cable 36 thereon. It should be mentioned at this point that the optimal length of the tracks 12a–d will vary according to the height of the frame 10a–c above the ground, the overall length thereof, the anticipated load to be carried on the bed 16, and the amount of force which can be reasonably exerted by the winch 32 and the cable 36 on the trailer bed 16. That is, as the tracks are shortened, more force has to be exerted on a loaded trailer bed 16 to raise it from its loading position to its traveling position at the approximate level of the frame 10a–c, since the angle of the track relative to the plane of the frame, and relative to the ground plane as well, increases and the mechanical advantage decreases as a result thereof. In the preferred embodiment of my invention, typical track angles were in the range from 25° to 50°. Moreover, if the bed is to remain in a substantially parallel position relative to the frame as the bed is raised and lowered, it is necessary that the tracks all be of equal length.

Figure 3:
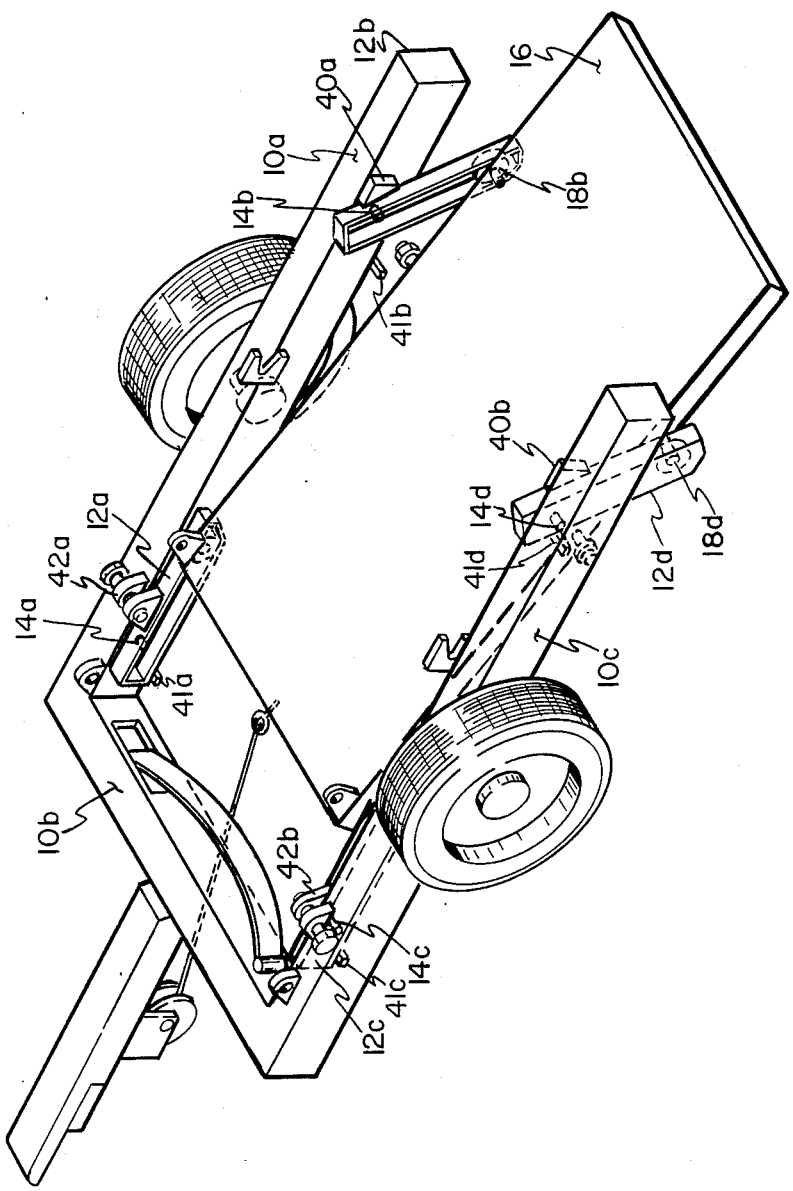
FIG. 3 is an orthographic view of the lift/tilt-bed trailer described in FIG. 1 hereof with the bed thereof in its tilted unloading position relative to the frame.

FIG. 3 is an orthographic representation of the tilted bed unloading position of my lift/tilt-bed trailer. The bed 16 is caused to tilt relative to the frame 10a–c by reversibly preventing the two forward tracks 12a,12c from pivoting about their pivots 14a,14c, respectively, as the bed 16 is caused to move in a rearward direction. This can be accomplished by locking means 42a,42b. Gravitational forces on the the bed resulting from its own mass or a load thereon still cause the rear tracks 12b,12d to pivot about their pivots 14b,14d, respectively, when the roller wheels 18b,18d, respectively, pass to the rear of the pivot locations. In its tilted position, the bed 16 can be unloaded by simply pushing cargo down the inclined plane formed thereby. Cargo may also be loaded onto the bed in its tilted position as shown in FIG. 3 by pushing the cargo up the inclined plane formed thereby, affixing the cargo thereto and causing the thereby loaded bed to return to its raised, traveling position by the operation of the winch 32 and the cable 36 thereon.

The foregoing description of a preferred embodiment of the invention has been presented for purposes of illustration and description. It is not intended to be exhaustive or to limit the invention to the precise form disclosed, and obviously many modifications and variations are possible in the light of the above teaching. For example, the bed raising, lowering and tilting apparatus for my invention might be incorporated directly into the bed of say a front wheel drive pickup truck to provide a self-propelled lift/tilt-bed vehicle. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. A lift/tilt-bed trailer which comprises in combination:
   a. a first substantially rigid elongated frame member having a first end and a second end;
   b. a second substantially rigid elongated frame member rigidly attached to said first frame member substantially perpendiuclar thereto at the first end thereof;
   c. a third substantially rigid elongated frame member rigidly attached to said first frame member in a direction substantally perpendicular thereto at the second end thereof and disposed in substantially the same direction as said second frame member, said third frame member being substantially parallel thereto, whereby a substantially planer, three-sided rectanguler "U"-frame is formed;
   d. a first wheel;
   e. a second wheel;
   f. means for rotatably attaching said first wheel to said second frame member such that said first wheel is located on the side of said second frame member away from said third frame member;
   g. means for rotatably attaching said second wheel to said third frame member in an opposing manner to said first wheel;
   h. a substantially planar rectangular bed adapted to fit substantially within said rectangular "U"-frame;
   i. bed positioning means for raising and lowering said substantially planer rectangular bed relative to said rectangular "U"-frame, said bed positioning means including:
      1. a first track member pivotably attached to said second frame member on the side thereof facing said third frame member;
      2. a second track member pivotably attached to said third frame member disposed in an opposing manner to said first track member;
      3. a third track member pivotably attached to said second frame member on the side thereof facing said third member and at a position thereon further away from said first frame member than said first track member;
      4. a fourth track member pivotably attached to said third frame member disposed in an opposing manner to said third track member;
      5. first bed translating means adapted to move within said first track member and be guided thereby, said first bed translating means being fixed to the outside edge of said bed in the vicinity of said first track member facing said first track member;
      6. second bed translating means adapted to move within said second track member and be guided thereby, said second bed translating means being fixed to the outside edge of said bed in the vicinity of said second track member facing said second track member;

7. third bed translating means adapted to move within said third track member and be guided thereby, said third bed translating means being fixed to the outside edge of said bed in the vicinity of said third track member facing said third track member; and 8. fourth bed translating means adapted to move within said fourth track member and be guided thereby, said fourth bed translating means being fixed to the outside edge of said bed in the vicinity of said fourth track member facing said fourth member; and j. means for imparting motion to said bed relative to said rectangular "U"-frame, whereby as said bed is moved toward said first frame member said bed is guided by said track members and said bed translating means to a position approximately level with said rectangular "U"-frame and approximately parallel thereto, said track members assuming a position substantially parallel to said rectangular "U"-frame, and whereby as said bed is moved away from said first frame member said bed is similarly guided to a position such that it is at rest on the surface upon which said first wheel and said second wheel are resting while said rectangular "U"-frame remains approximately parallel thereto, each of said track members having the end thereof away from said first frame member touching the surface and forming an angle with said rectangular "U"-frame as a result of having pivoted about said pivotable attachment therof.

2. The lift/tilt-bed trailer as described in claim 1, wherein said bed translating means includes roller wheels adapted to roll inside of said track members and means for rotatably attaching said roller wheels to said bed such that each of said roller wheels is located outside of the edge of said bed facing said corresponding track member, and wherein each of said track members has the same length, whereby said bed remains substantially parallel to said rectanguler "U"-frame as said bed is caused to move relative to said first frame member under the action of said means for imparting motion to said bed, said tracks and said bed translating means.

3. The lift/tilt-bed trailer as described in claim 2, further comprising towing means for imparting motion to the lift/tilt-bed trailer.

4. The lift/tilt-bed trailer as described in claim 3, wherein said towing means includes a substantially rigid elongated member rigidly attached to said first frame member substantially perpendicular thereto in a direction away from said second frame member and said third frame member, said towing means being located substantially in between the first end and the second end of said first frame member, and wherein said means for imparting motion of said bed relative to said rectangular frame comprises a winch attached to said elongated member, said winch having a cable attached substantially near to the edge of said bed facing said first frame member, and spring means for providing a force against the edge of said bed facing said first frame member when said bed is located nearest to said first frame member against the action thereon by said cable, thereby forcing said bed away frm said first frame member when the tension is released on said cable.

5. The lift/tilt-bed trailer as described in claim 4, further comprising means for reversibly locking said bed to said rectangular "U"-frame when said bed is located in its nearest position to said first frame member, thereby removing the necessity for continuous tension on said cable to keep said bed in its nearest position to said first frame member.

6. The lift/tilt-bed trailer as described in claim 1, further comprising means for reversibly preventing said first track member from pivoting relative to said second frame member and for reversibly preventing said second track member from pivoting relative to said third frame member as said bed is moved relative to said first frame member, whereby said bed tilts as said bed is moved away from said first frame member such that the edge of said bed located away from said first frame member will approach and eventually rest on the ground surface on which the lift/tilt-bed trailer is resting, while the edge of said bed facing said first frame member remains approximately in the plane of said rectangular "U"-frame.

7. The lift/tilt-bed trailer as described in claim 1, further comprising means for preventing said track members from pivoting substantially beyond the angle made by any of said track members which have pivoted about their respective pivotable attachment locations relative to said rectangular "U"-frame when said bed is caused to move from a position of contact with the ground surface on which the lift/tilt-bed trailer is resting toward said first frame member.

8. The lift/tilt-bed trailer as described in claim 7, further comprising means for preventing said track members from pivoting substantially out of the plane defined by said rectangular "U"-frame on the side thereof away from the ground surface on which the lift/tilt-bed trailer is resting when said bed is caused to move toward said first frame member.

9. The lift/tilt-bed trailer as described in claim 1, further comprising means for preventing said second frame member and said third frame member from moving substantially away from a parallel configuration as a result of motion of the lift/tilt-bed trailer.

10. The lift/tilt-bed trailer as described in claim 9, wherein said means for preventing said second frame member and said third frame member from moving substantially away from a parallel configuration as result of the motion of said lift/tilt-bed trailer comprises a first headed bar rigidly affixed to said bed and protuding from the edge thereof in the direction of said second frame member, a second headed bar rigidly affixed to said bed, protruding from the edge thereof in the direction of said third frame member at a position on the edge opposite to the location of said first headed bar, a first slotted member rigidly attached to said second frame member in the vicinity of the side thereof facing said bed when said bed is located in its closest position to said first frame member, and a second slotted member rigidly attached to said third frame member in the vicinity of the side thereof facing said bed when said bed is located in its closest position to said first frame member, said first slotted member being adapted to receive and hold said first headed bar and said second slotted member being adapted to receive and hold said second headed bar when said bed is moved into the position closest to said first frame member, whereby the tendency for separation of said second frame member and said third frame member under the influence of forces generated by the motion of the lift/tilt-bed trailer is reduced.

* * * * *